United States Patent [19]

Inoue et al.

[11] Patent Number: 4,572,844
[45] Date of Patent: Feb. 25, 1986

[54] METHOD FOR PREPARING COATED POWDER

[75] Inventors: Hiroshi Inoue, Kawaguchi; Akihiko Tsuge, Yokohama; Katsutoshi Komeya, Nakagun, all of Japan

[73] Assignee: Kabushiki Kaisha Toshiba, Kawasaki, Japan

[21] Appl. No.: 602,447

[22] Filed: Apr. 20, 1984

[30] Foreign Application Priority Data

Apr. 30, 1983 [JP] Japan .................. 58-76430

[51] Int. Cl.$^4$ .................. B05D 1/12; C04B 35/52; C04B 35/56
[52] U.S. Cl. .................. 427/180; 427/212; 427/215; 501/88; 501/89; 501/90; 501/100; 419/35; 419/63; 419/64; 428/570
[58] Field of Search .................. 419/5, 6, 8, 9, 10, 419/11, 13, 14, 30, 31, 35, 63, 64; 501/87, 96, 127, 153, 88, 89, 90, 100; 427/217, 215, 250, 219, 216, 180, 937, 212; 428/357, 361, 362, 368, 402, 403, 404, 405, 406, 407, 570

[56] References Cited

U.S. PATENT DOCUMENTS

| | | | |
|---|---|---|---|
| 4,011,064 | 3/1977 | Lee et al. | 427/212 |
| 4,218,507 | 8/1980 | Deffeyes et al. | 419/35 |
| 4,492,730 | 1/1985 | Kaisha | 428/328 |

FOREIGN PATENT DOCUMENTS 5891059  5/1983  Japan .

*Primary Examiner*—Thomas Wallen
*Attorney, Agent, or Firm*—Schwartz, Jeffery, Schwaab, Mack, Blumenthal & Evans

[57] ABSTRACT

There is disclosed a method for preparing a coated powder comprising the steps of adding a carbon powder and an aluminum nitride powder to a methylsilicic acid powder or a precursor of the methylsilicic acid and mixing them and then subjecting the resulting mixed powder to a heat treatment in an atmosphere including an inert gas or a carbon component-containing gas in order to coat the aluminum nitride powder with silicon carbide.

This invention provides a chemically stable coated powder and a sintered body obtained by employing the coated powder has a good thermal conductivity.

8 Claims, No Drawings

METHOD FOR PREPARING COATED POWDER

BACKGROUND OF THE INVENTION

This invention relates to a method for preparing a coated powder, more particularly to a method for preparing a coated powder in which an aluminum nitride powder is coated with silicon carbide.

In recent years, much attention has been paid to using a sintered aluminum nitride (AlN) body as a high-temperature material because of its excellent heat resistance, thermal shock resistance and thermal conductivity. The sintered aluminum nitride body, however, has somewhat chemically unstable properties, especially since it reacts with water to produce ammonia when converted into an oxide. For this reason, the sintered body cannot comprise to any structural member which is required to be chemically stable for a long period of time. Particularly, the aluminum nitride powder which is a raw material for the sintered body brings about the above-mentioned phenomenon and is also considered to cause some trouble when added to a resin as a filler.

With the aim of solving such problems above, the present applicants have already suggested, in a patent application, a composite ceramic powder in which a silicon carbide powder is coated with aluminum nitride and which has a chemical stability and a good thermal conductivity (see Japanese Provisional Patent Publication No. 91059/1983). As one manufacturing example of such a coated powder, a coating method is disclosed which comprises externally adding active aluminum and nitrogen to the silicon carbide powder and depositing aluminum nitride on surfaces of the silicon carbide powder particles. A vapor phase method may be used as a method for adhering aluminum nitride on surfaces of the silicon carbide. However, this method presents the technical difficulty that the aluminum nitride can not be completely coated to each of the silicon carbide powder particles, and if the coating is not complete, electrical characteristics of the sintered body could not be satisfied.

An object of this invention is to provide a method capable of preparing in a manner of mass production a chemically stable composite ceramic powder where an aluminum nitride powder is coated, on each surface thereof, with a uniform silicon carbide film having enough thickness.

SUMMARY OF THE INVENTION

A method for preparing a composite ceramic powder according to this invention comprises the steps of adding a carbon powder and an aluminum nitride powder to a methylsilicic acid powder or a precursor thereof and mixing them, and then subjecting the resulting mixed powder to a heat treatment in an atmosphere including an inert gas or a carbon component-containing gas in order to coat the aluminum nitride powder with silicon carbide.

DESCRIPTION OF THE PREFERRED EMBODIMENT

A methylsilicic acid ($CH_3SiO_{3/2}$) powder used in this invention can be obtained, for example, by hydrolyzing methyltrichlorosilane ($CH_3SiCl_3$) which is produced in large amounts by the silicone industry.

Further, in addition to the above, there may be employed, as a starting material or a precursor of the methylsilicic acid, tetraethoxysilane ($Si(OC_2H_5)_4$), methyl silane ($CH_3SiH_3$), tetramethoxysilane ($Si(OCH_3)_4$) and the like which form a substance corresponding to methylsilicic acid by hydrolyzing treatment.

As carbon powders used in this invention, there can be employed a variety of carbon powders such as a carbon black powder, an acetylene black powder and a furnace black powder.

With regard to a proportion of the carbon powder with respect to the methylsilicic acid powder, an amount of the carbon powder is preferably within the range of 0.01 to 0.4 part by weight, more preferably 0.09 to 0.27 part by weight, with respect to one part by weight of the methylsilicic acid powder. The range just mentioned is based on the following rationale: When the amount of the carbon powder is less than 0.01 part by weight, oxygen combining with silicon in the methylsilicic acid powder will not be reduced sufficiently and the oxygen will tend to remain in the produced composite ceramic powder, and when it is more than 0.4 part by weight, a production efficiency of the composite ceramic powder will be lowered, and what is worse, a subsequent decarburization will take a great deal of time.

With regard to a proportion of an aluminum nitride powder, which is used in this invention, with respect to the methylsilicic acid, an amount of the aluminum nitride powder is preferably within the range of 1.0 to 29.0 parts by weight, more preferably 2.0 to 20.0 parts by weight, with respect to one part by weight of the methylsilicic acid powder. The aforesaid range is based on the following rationale: When the amount of the aluminum nitride powder is less than 1.0 part by weight, the produced silicon carbide coating content will be excessive in comparison with the amount of the aluminum nitride powder, and the electric insulating properties inherent in the aluminum nitride will tend to be impaired. In contrast, when the amount is more than 29.0 parts by weight, the production of the silicon carbide for the coating film will be insufficient, so that it will be difficult to obtain the chemically stable composite ceramic powder.

The heat treatment mentioned above is carried out preferably at a temperature of 1350° to 1600° C., more preferably at a temperature of 1440° to 1550° C. When the heat treatment temperature is less than 1350° C., a reaction will be insufficient, and when it is more than 1600° C., an active silicone compound will tend to be introduced into crystals of the aluminum nitride powder at the time of the reaction impairing thermal properties of the produced composite ceramic powder.

An atmosphere employed at a heat treatment comprises an inert gas such as argon or neon, or a carbon component-containing gas such as methane, or a mixed gas thereof.

In addition, after the aluminum nitride powder has been coated with the silicon carbide by means of the heat treatment, it is preferred that a decarburization treatment is carried out in air of 600° to 800° C. If such a decarburization treatment is implemented, free carbon contained in the produced composite ceramic powder will be completely oxidized and removed.

According to this invention, the carbon powder and the aluminum nitride powder are added to the methylsilicic acid powder or precursor thereof, and the resulting mixed powder is subjected to the heat treatment in the atmosphere including the inert gas or the carbon component-containing gas, whereby the methylsilicic acid and the carbon are reacted with each other to produce gaseous silicon carbide around each aluminum nitride powder particle and the silicon carbide is deposited and grows on the aluminum nitride powder particle as a nucleus. It can be considered that the production of the silicon carbide is accomplished by the following reactions:

$$2CH_3SiO_{3/2} + C \rightarrow 2SiC + CO + 3H_2$$

$$SiC + C \rightarrow Si + CO$$

$$Si + C \rightarrow SiC$$

Therefore, there can be obtained the desired composite ceramic powder in which each aluminum nitride powder particle in the mixed powder is coated with the uniform silicon carbide coating film having an adequate thickness, in a simple procedure and in a style of mass production.

The present invention will be further described with relation to examples.

EXAMPLE 1

In the first place, there was prepared a mixed powder comprising one part by weight of a methylsilicic acid powder having an average particle diameter of 0.05 mm, 0.2 part by weight of a carbon black powder having an average particle diameter of 0.03 μm and 28 parts by weight of an aluminum nitride powder having an average particle diameter of 0.7 μm. The prepared mixed powder was then subjected to a heat treatment at a temperature of 1450° C. for a period of 5 hours in an argon gas in order to carry out a reaction. Afterward, a decarburization treatment was conducted at 700° C. for 3 hours in air.

According to a composition inspection of the resulting synthesized powder, contents of the aluminum nitride and the silicon carbide were 98% and 2%, respectively. Further, the obtained synthesized powder (composite ceramic powder) was added to water and boiled for 5 hours, and its weight change was then inspected. An observed weight increase of the synthesized powder was as small as 1.2%, though that of the aluminum nitride powder simple substance was 14%. This fact indicates that the surfaces of the aluminum nitride powder particles were sufficiently modified with the silicon carbide coating film applied. Incidentally, if the aluminum nitride is reacted with water to be completely converted into aluminum oxide, its weight will theoretically be increased as much as 24.4%. Moreover, it was confirmed that, with regard to a sintered body which was made by molding and sintering the obtained synthesized powder, excellent thermal properties, e.g., thermal conductivity, inherent in the aluminum nitride were maintained, and thus a sintered body having the other characteristics necessary for a heat sinking plate was obtained.

EXAMPLE 2

A mixed powder comprising one part by weight of a methylsilicic acid powder having an average particle diameter of 0.05 mm, 0.3 part by weight of a carbon black powder having an average particle diameter of 0.03 μm and one part by weight of an aluminum nitride powder having an average particle diameter of 0.7 μm was thermally treated in the same manner as in Example 1 and was then subjected to a decarburization treatment in order to manufacture a coated powder.

The resulting coated powder was composed of 62.5% of the aluminum nitride and 37.5% of the silicon carbide. According to an inspection of the stability of the synthesized powder in the same boiling manner as in Example 1, its weight increase was no more than 0.2% and it was found to be substantially completely stable. Moreover, it was confirmed that, with regard to a sintered body which was made by molding and sintering this synthetic powder, thermal properties inherent in the aluminum nitride were not changed, though its electrical resistance was lowered a little.

EXAMPLE 3

Mixed powders (Sample Nos. 1 to 5) each having the compositions as shown in Table 1 below were thermally treated under the conditions shown in Table 1, and were then subjected to a decarburization treatment in order to manufacture coated powders, respectively.

Based on a composition inspection of the each resulting powder in the same manner as in Example 1, the results as shown in Table 1 were obtained. Further, inspections of the stability of the each synthesized powder in the same boiling manner as in Example 1, and of the thermal conductivity of the each sintered body which was made by molding and then sintering each synthesized powder, were carried out. The results obtained are shown in Table 1.

TABLE 1

| Sample No. | Composition (weight ratio) | | | Reaction condition | | Composition of the synthesized powder (wt %) | | Weight increase after 5 hours boiling (%) | Thermal conductivity of the sintered body (W/m °K.) |
|---|---|---|---|---|---|---|---|---|---|
| | $CH_3SiO_{3/2}$ | C | AlN | Temperature (°C.) | Time (hr) | AlN | SiC | | |
| 1 | 1 | 0.2 | 28 | 1450 | 5 | 98 | 2 | 1.2 | 92 |
| 2 | 1 | 0.3 | 1 | 1450 | 5 | 62.5 | 37.5 | 0.2 | 117 |
| 3 | 1 | 0.01 | 28 | 1450 | 5 | 98.6 | 1.4 | 1.1 | 92 |
| 4 | 1 | 1 | 28 | 1450 | 5 | 97.8 | 2.2 | 1.0 | 93 |
| 5 | 1 | 0.2 | 28 | 1600 | 5 | 97.7 | 2.3 | 0.9 | 93 |

As described above in detail, according to this invention, the chemically stable coated powder, where the aluminum nitride is coated with the uniform silicon carbide coating film having a sufficient film thickness, can be mass produced. Further, this invention provides a chemically stable sintered body having a good thermal conductivity comprising the above composite ceramic powder as a starting material.

We claim:

1. A method for preparing a coated powder which comprises the steps of:
    adding a carbon powder and an aluminum nitride powder to a methylsilicic acid powder or a precursor of the methylsilicic acid;
    mixing them;

and then subjecting the resulting mixed powder to a heat treatment in an atmosphere including an inert gas or a carbon component-containing gas in order to coat said aluminum nitride powder with silicon carbide which is made by reaction of methylsilicic acid and said carbon powder.

2. The method of preparing a coated powder according to claim 1, wherein said heat treatment is carried out at a temperature of 1350° to 1600° C.

3. The method for preparing a coated powder according to claim 1, wherein said methylsilicic acid powder is that which has been obtained by the hydrolysis of methytrichlorosilane.

4. The method for preparing a coated powder according to claim 1, wherein an amount of said carbon powder is within the range of 0.01 to 0.4 part by weight with respect to one part by weight of said methylsilicic acid powder.

5. The method for preparing a coated powder according to claim 1, wherein an amount of said aluminum nitride powder is within the range of 1.0 to 29.0 parts by weight with respect to one part by weight of said methylsilicic acid powder.

6. The method for preparing a coated powder according to claim 1, wherein said atmosphere comprises at least one gas selected from the group consisting of an argon gas, a neon gas and a methane gas.

7. The method for preparing a coated powder according to claim 1, which further includes a decarburization treatment in air having a temperature of 600° to 800° C.

8. The method for preparing a coated powder according to claim 1, wherein said precursor of the methylsilicic acid is a methyl silane.

* * * * *